No. 835,793. PATENTED NOV. 13, 1906.
J. M. KERWIN, T. F. BROOMALL, Jr. & H. H. BROOMALL.
VEHICLE WHEEL.
APPLICATION FILED NOV. 18, 1905.

WITNESSES:
L. Webster, Jr.
J. S. Williamson

INVENTORS
John M. Kerwin
Taylor F. Broomall Jr.
Harry H. Broomall
By
W. Truben Williamson
Attorney

UNITED STATES PATENT OFFICE.

JOHN M. KERWIN, TAYLOR F. BROOMALL, JR., AND HARRY H. BROOMALL, OF PHILADELPHIA, PENNSYLVANIA.

VEHICLE-WHEEL.

No. 835,793.     Specification of Letters Patent.     Patented Nov. 13, 1906.

Application filed November 18, 1905. Serial No. 288,097.

*To all whom it may concern:*

Be it known that we, JOHN M. KERWIN, TAYLOR F. BROOMALL, Jr., and HARRY H. BROOMALL, citizens of the United States, residing at Philadelphia, county of Philadelphia, and State of Pennsylvania, have invented a certain new and useful Improvement in Vehicle-Wheels, of which the following is a specification.

Our invention relates to a new and useful improvement in vehicle-wheels, and has for its object to so construct such a wheel as to produce a spring or cushion action between the rim and the hub thereof whereby the jar and vibration incident to the wheel traveling over a road-bed will be largely absorbed within the wheel instead of being transmitted to the vehicle and the occupants.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
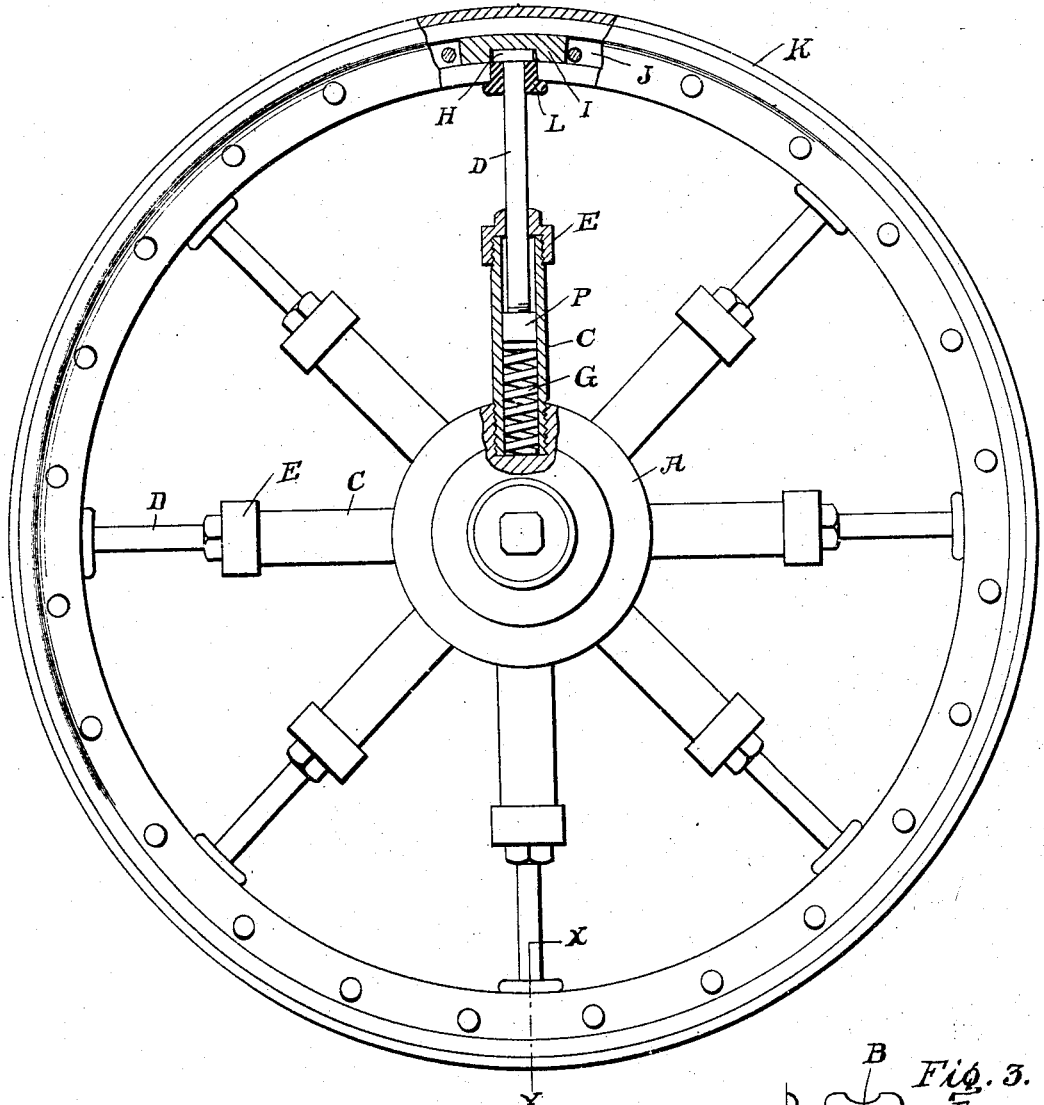
Figure 2:
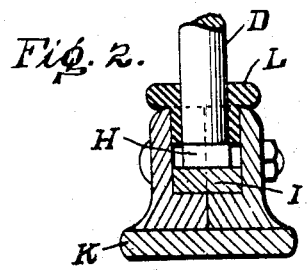
Figure 3:
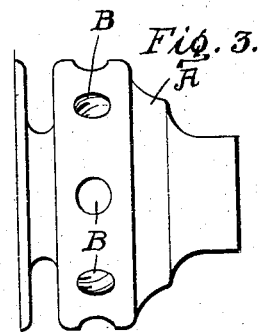

Figure 1 is a side elevation of our improved wheel, a portion thereof being in section, clearly illustrating the construction of the same; Fig. 2, a section at the line X X of Fig. 1; Fig. 3, a detail view of the hub.

Referring to the drawings, A represents the hub of the wheel having the holes B formed around its periphery, said holes being threaded to receive the tubular sections C of the spokes, which may be of any number.

D designates rods forming the remaining sections of the spokes, and these rods pass through the caps E, which latter are threaded upon the outer ends of the tubular sections C and have upon their inner ends the plungers P, which fit snugly within the tubular sections, so as to slide longitudinally thereto. These plungers bear against the coil-springs G, located within the tubular sections, and the outer ends of the sections D of the spokes have formed thereon heads H, which fit in sockets formed in the blocks I. The blocks I are set in the groove J, formed in the rim K of the wheel, so as to have a sliding movement therein, and in order that the sections D of the spokes may follow this sliding movement to a limited extent rubber bushings L are set in suitable holes formed in the inner periphery of the rim and surround the sections D, as clearly shown in Fig. 1.

In practice the rim may be made in two sections, as shown in Fig. 2, and bolted together to facilitate the insertion of the blocks I and rubber bushings.

From this description it will be seen that a wheel thus made when striking any obstruction while traveling over a road-bed will absorb the greater portion of the jar which would otherwise be transmitted to the vehicle, the effect being to force the sections D of the lower spokes upward against the action of the springs G, the rubber bushings permitting a slight side movement of all the spokes except those which happen to be directly upon the vertical line when said obstruction is encountered, the blocks I sliding in the rim in unison with the side movement of the spokes.

Our improved wheel entirely overcomes the many disadvantages which have heretofore attended upon the use of the ordinary wheel for motor-vehicles, for when said wheels are fitted with solid rubber tires the shock and vibration transmitted to the body of the vehicle are trying upon the mechanism as well as the occupants, and where pneumatic tires are used constant annoyance and expense are occasioned by puncture and other accidents, and when a pneumatic tire is out of repair the vehicle is seriously crippled, whereas by our improvement the resiliency of the pneumatic tire is provided without the liability of accident from puncture and deflating.

Having thus fully described our invention, what we claim as new and useful is—

1. In a vehicle-wheel, the combination of a hub, tubes threaded into said hub forming the inner section of the spokes, springs located within the tubes, sections D fitted to slide within the tubes and bear against the springs, heads H formed upon the outer ends of sections D, blocks I in which said heads are seated, a rim having a groove in which said blocks are fitted to slide, and rubber bushings fitted in holes formed in the rim and surrounding the sections D, as and for the purpose set forth.

2. The herein-described combination of a hub A, tubes C threaded therein, caps E threaded upon the outer ends of the tubes, sections D passing through said caps, plungers P carried by the inner ends of the sections D, springs G located within the tubes and against which the plungers bear, heads H formed upon the outer ends of the sections D; blocks I in which the heads are seated, a rim having a groove therein in which said blocks are adapted to slide, and a rubber bushing set in holes in the rim and surrounding the sections D so as to limit their sidewise movement, as specified.

In testimony whereof we have hereunto affixed our signatures in the presence of two subscribing witnesses.

JOHN M. KERWIN.
TAYLOR F. BROOMALL, Jr.
HARRY H. BROOMALL.

Witnesses:
MARY E. HAMER,
E. N. SCHOFIELD.